(12) United States Patent
Morbieu et al.

(10) Patent No.: US 8,215,818 B2
(45) Date of Patent: Jul. 10, 2012

(54) LED LIGHT BOX WITH PHOTODETECTOR CONTROL

(75) Inventors: Bertrand Morbieu, St Cyr sur Loire (FR); David Shaillou, Aze (FR)

(73) Assignee: Thales (FR)

( * ) Notice: Subject to any disclaimer, the term of this patent is extended or adjusted under 35 U.S.C. 154(b) by 955 days.

(21) Appl. No.: 11/576,237

(22) PCT Filed: Sep. 6, 2005

(86) PCT No.: PCT/EP2005/054378
§ 371 (c)(1),
(2), (4) Date: Mar. 28, 2007

(87) PCT Pub. No.: WO2006/034943
PCT Pub. Date: Apr. 6, 2006

(65) Prior Publication Data
US 2008/0062116 A1    Mar. 13, 2008

(30) Foreign Application Priority Data
Sep. 28, 2004   (FR) .................................... 04 10270

(51) Int. Cl.
*F21V 7/04* (2006.01)
(52) U.S. Cl. ........ 362/612; 362/613; 362/624; 362/627; 362/249.02; 362/249.06
(58) Field of Classification Search .................. 362/612, 362/613, 617–627, 55, 561, 97.3, 219, 231, 362/240, 249.02, 249.06
See application file for complete search history.

(56) References Cited

U.S. PATENT DOCUMENTS

| | | | |
|---|---|---|---|
| 4,904,991 A | | 2/1990 | Jones et al. |
| 5,743,616 A | * | 4/1998 | Giuliano et al. .............. 362/612 |
| 5,931,555 A | * | 8/1999 | Akahane et al. .............. 362/613 |
| 6,988,813 B2 | * | 1/2006 | Hoelen et al. ................. 362/601 |
| 7,108,413 B2 | * | 9/2006 | Kwong et al. ................ 362/583 |
| 7,344,292 B2 | * | 3/2008 | Kim ............................. 362/612 |
| 7,350,955 B2 | * | 4/2008 | Chang et al. .................. 362/612 |
| 7,423,705 B2 | * | 9/2008 | Len-Li et al. .................. 349/61 |
| 7,482,567 B2 | * | 1/2009 | Hoelen et al. ................. 250/205 |
| 7,510,300 B2 | * | 3/2009 | Iwauchi et al. ............... 362/231 |
| 7,513,671 B2 | * | 4/2009 | Ng et al. ....................... 362/612 |
| 7,553,060 B2 | * | 6/2009 | Tanabe ......................... 362/612 |
| 7,697,089 B2 | * | 4/2010 | Yoon et al. ..................... 349/65 |
| 2001/0049893 A1 | * | 12/2001 | Maas et al. ..................... 40/544 |

(Continued)

FOREIGN PATENT DOCUMENTS

EP    0 341 817 A    11/1989

(Continued)

*Primary Examiner* — Ismael Negron
(74) *Attorney, Agent, or Firm* — Lowe Hauptman Ham & Berner, LLP

(57) ABSTRACT

A box includes a lightguide in the form of a thin plate having two opposed main faces and at least two edges, the lightguide having a light-diffusing optical structure on one of the faces. Light-emitting diodes are placed linearly along at least one of the edges of the lightguide, the light emitted by the light-emitting diodes illuminates the lightguide via the edge, and is being diffused by that face of the lightguide having the optical structure. The light emitting diodes placed along each of the edges of the lightguide are organized in at least two rows and in such a way that a light-emitting diode in one row supplied by an electric power supply is immediately followed by a light-emitting diode in the other row supplied by another electric power supply.

12 Claims, 7 Drawing Sheets

U.S. PATENT DOCUMENTS

| | | |
|---|---|---|
| 2004/0114344 A1 | 6/2004 | Burtsev et al. |
| 2004/0246275 A1 | 12/2004 | Yoshihara et al. |
| 2005/0141244 A1* | 6/2005 | Hamada et al. ............... 362/612 |
| 2005/0180167 A1* | 8/2005 | Hoelen et al. ................. 362/613 |
| 2005/0195589 A1* | 9/2005 | Sung et al. ...................... 362/27 |
| 2005/0207178 A1* | 9/2005 | Parker ........................... 362/612 |
| 2006/0056178 A1* | 3/2006 | Len-Li et al. ................. 362/231 |
| 2006/0181901 A1* | 8/2006 | Sakai et al. ................... 362/613 |
| 2007/0064444 A1* | 3/2007 | Kim et al. ..................... 362/612 |
| 2007/0253218 A1* | 11/2007 | Tanabe ......................... 362/612 |
| 2008/0170393 A1* | 7/2008 | Chin ............................. 362/231 |

FOREIGN PATENT DOCUMENTS

| | | |
|---|---|---|
| JP | 2004/233555 A | 8/2004 |
| WO | 01/84227 A | 11/2001 |
| WO | 03/021565 A | 3/2003 |

* cited by examiner

PRIOR ART

LED LIGHT BOX WITH PHOTODETECTOR CONTROL

CROSS REFERENCE TO RELATED APPLICATIONS

The present Application is based on International Application No. PCT/EP2005/054378, filed on Sep. 6, 2005, which in turn corresponds to France Application No. 0410270 filed on Sep. 28, 2004, and priority is hereby claimed under 35 USC §119 based on these applications. Each of these applications are hereby incorporated by reference in their entirety into the present application.

FIELD OF THE INVENTION

The invention relates to a light box, intended especially for the backlighting of liquid crystal displays.

BACKGROUND OF THE INVENTION

The backlighting of liquid crystal displays for avionics is usually accomplished by light boxes containing fluorescent tubes. These displays produce luminosities of the order of 1000 Cd/m$^2$ necessary for daytime vision, sometimes in bright sunlight. Furthermore, the illumination output by the light box must be able to be adjusted so as to greatly reduce its luminosity during night flights, for example to levels of the order of 0.1 Cd/m$^2$.

FIGS. 1a, 1b and 1c show various views of a light box of the prior art based on fluorescent tubes.

FIG. 1a shows a sectional view of a light box of the prior art, based on fluorescent tubes. The box in FIG. 1a, of rectangular shape, comprises a case 10 having a bottom 12 with an opening 14 that faces the bottom 12, for backlighting a liquid crystal display 16.

The bottom 12 of the case 10 has a reflector 20 and an array of fluorescent tubes 22 parallel to the bottom of the case and, across the opening 14, a light diffuser 24. The reflector 20 is of known shape so that the light rays r emitted by the fluorescent tubes are directed onto the light diffuser 24, uniformly illuminating the liquid crystal display.

The light box further includes a waveguide 30 in the form of a plate having two parallel faces 32, 34 and edges 36. The face 32 turned toward the opening 14 of the box includes a diffusing structure 38 for diffusing the light generated by a lateral fluorescent tube 40 illuminating one of the edges of the lightguide.

FIG. 1b shows a top view of the box of FIG. 1a, showing the arrangement of the lateral fluorescent tube 40 on the edge 36 of the lightguide 30 having the diffusing structure 38 on the face 32 turned toward the liquid crystal display.

FIG. 1c is a partial view of one edge of the lightguide, illuminated by the lateral fluorescent tube 40, showing the path of the light rays I diffused by the face 32 of the lightguide having the diffusing structure 38.

When the ambient light is strong, for example, during the day, the array of fluorescent tubes 22 is turned on, producing a high level of illumination for the liquid crystal display. At night, the illumination must be much lower. The array of fluorescent tubes is therefore turned off and only the single lateral fluorescent tube 40 is turned on, creating a low level of light diffused by the lightguide (or waveguide) 30 through the diffuser 24 toward the liquid crystal display 16.

Furthermore, the range of variation of the light intensity offered by the light box may be extended by controlling the power supplied to the tubes. For this purpose, the supply voltage for the fluorescent tubes is in the form of rectangular pulses having a frequency ranging from a few tens to a few hundred hertz. The power supplied to the tubes may be adjusted by varying the duty cycle of the rectangular pulses.

The luminosity performance of light boxes based on fluorescent tubes is satisfactory for illuminating liquid crystal displays intended in particular for avionics. However, such boxes have a large volume and require regular maintenance owing to the lifetime of the fluorescent tubes.

It is known today to use light-emitting diodes or LEDs instead of fluorescent tubes for producing light boxes. The progress made in light-emitting diodes allows light-emitting diode light boxes to be produced that are less bulky than fluorescent tube light boxes and at a lower cost, whilst approaching the efficiencies and luminous intensities obtained with fluorescent tubes.

FIG. 2a shows a device for illuminating a light guide 41 comprising light-emitting diodes.

The device of FIG. 2a comprises two rows Ra1, Rb2 of LEDs Lnm wired to a printed circuit 42. Each row Ra1, Ra2 has seven LEDs connected in series (n being the number of the row, 1 or 2, and m the number of the LED in each row, 1 to 7). The rows of LEDs are aligned, one after another, along one of the edges B1 of the lightguide 41 in the form of a thin plate, having two opposed main faces and four edges B1, B2, B3, B4 which delimit the plate.

As in the light box shown in FIG. 2a, the lightguide 41 has, on one of the faces 44, an optical structure 50 for diffusing the light propagating in the lightguide.

The lightguide 41 transmits the light generated by the rows Ra1, Ra2 of light-emitting diodes L11, . . . L17 and L21, . . . L27, applied to its edge B1, which, by propagating in the lightguide, is diffused by its optical structure 50 uniformly over the entire face 44 of the lightguide, as already described above.

Each row Ra1, Ra2 of light-emitting diodes is connected to an electric power supply S1, for row Ra1, and to electric power supply S2, for row Ra2, respectively.

FIG. 2b shows the circuit diagram for connecting the rows of diodes Ra1 and Ra2, of FIG. 2a, to their respective power supplies S1 and S2.

The light boxes of the prior art shown in FIGS. 2a and 2b having a light source based on light-emitting diodes have however the drawback, in the event of a diode or a power supply failing, of causing a loss of uniformity of the luminosity on the surface to be illuminated.

This is because the result of one of the power supplies S1, S2 failing or one of the diodes of a row of light-emitting diodes being turned off is a loss of illumination on a half-edge (B1) of the box's lightguide and a variation in the luminosity according to the illuminated portion of the display. A variation in the luminosity of the light box, and consequently of the liquid-crystal display that it illuminates, may impair the legibility of instruments on board aircraft. This may be very troublesome for the pilot.

SUMMARY OF THE INVENTION

To alleviate the drawbacks of the LED light boxes of the prior art, the invention proposes a light box, intended especially for the backlighting of liquid crystal displays, the box comprising:

a lightguide in the form of a thin plate having two opposed main faces and at least two edges, the lightguide having a light-diffusing optical structure on one of the faces;

light-emitting diodes placed linearly along at least one of the edges of the lightguide, the light emitted by the light-emitting diodes which illuminates the lightguide via the edge being diffused by that face of the lightguide having the optical structure;

characterized in that the light-emitting diodes placed along each of the edges of the lightguide are organized in at least two rows and in such a way that a light-emitting diode in one row supplied by an electric power supply is immediately followed by a light-emitting diode in the other row supplied by another electric power supply.

In a first variant, the light box according to the invention includes at least one photodetector delivering a luminous intensity signal corresponding to the light emitted by the box. The luminous intensity data output by the photodetector is transmitted to a device for controlling or servocontrolling the luminance of the light box.

In a second variant of the light box according to the invention, the LEDs of at least one of the branches (or rows) emits a light spectrum different than that of the other branches.

In a third variant, the light box according to the invention includes three photodetectors provided with color filters for capturing the light radiation of the light box in the red, green and blue colors so as to produce signals for chromatically balancing the rows of light-emitting diodes.

In a preferred embodiment, the light box according to the invention includes a lightguide of rectangular shape having four edges and eight rows of light-emitting diodes, one pair of diode rows illuminating a respective edge of the lightguide.

A main object of this invention is to minimize the variation in uniformity of the illumination provided by a light box in the event of one or more rows of LEDs or power supplies for the LEDs failing.

Another object of the invention is to maintain sufficient luminosity for illuminating the liquid crystal display, especially in the event of one or more rows of light-emitting diodes of the light box failing.

BRIEF DESCRIPTION OF THE DRAWINGS

The invention will be more clearly understood with the aid of exemplary embodiments of light boxes according to the invention, with reference to the appended figures in which.

DETAILED DESCRIPTION OF EMBODIMENTS

Figure 1A:
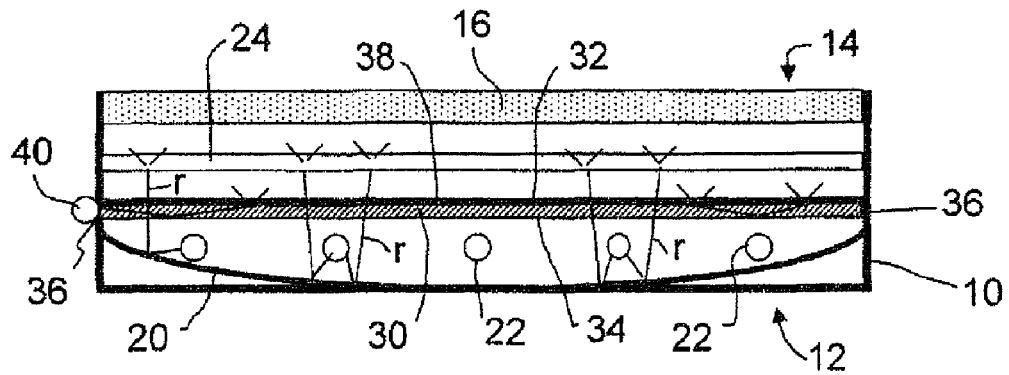
FIGS. 1a, 1b and 1c, already described, show various views of a light box according to the prior art, based on fluorescent tubes.
Figure 1B:
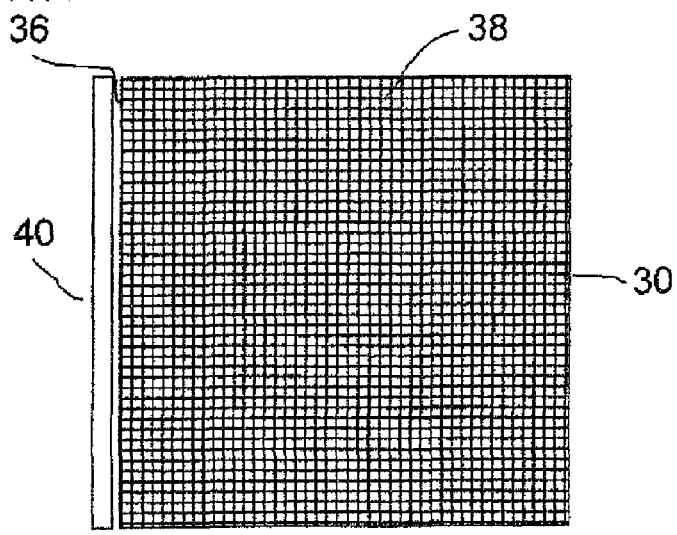
Figure 1C:
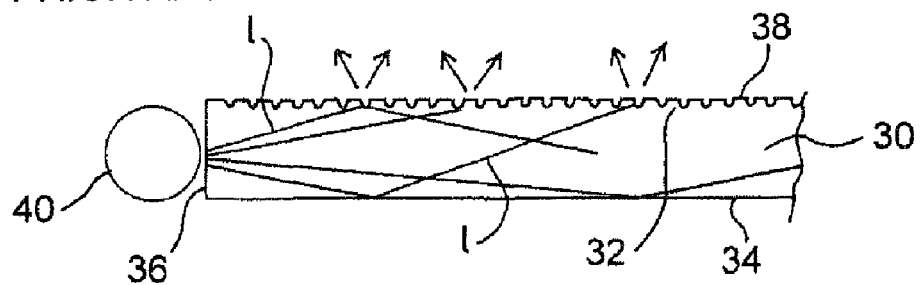
Figure 2A:
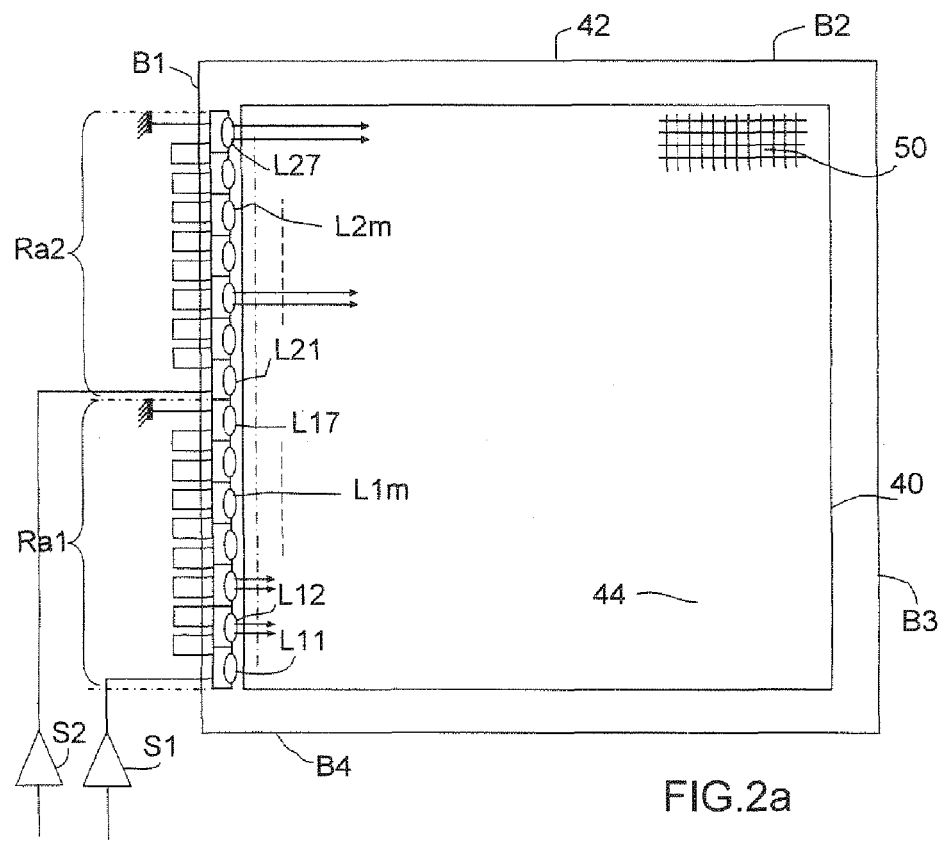
FIG. 2a shows a device for illuminating a lightguide, comprising light-emitting diodes.
Figure 2B:
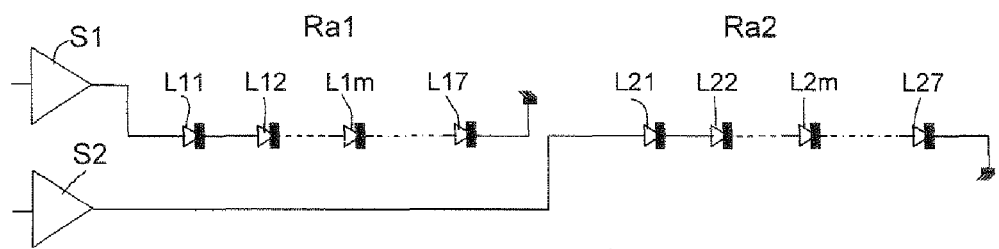
FIG. 2b shows the circuit diagram for connecting the rows of diodes Ra1 and Ra2, of FIG. 2a, to their respective power supplies S1 and S2.
Figure 3A:
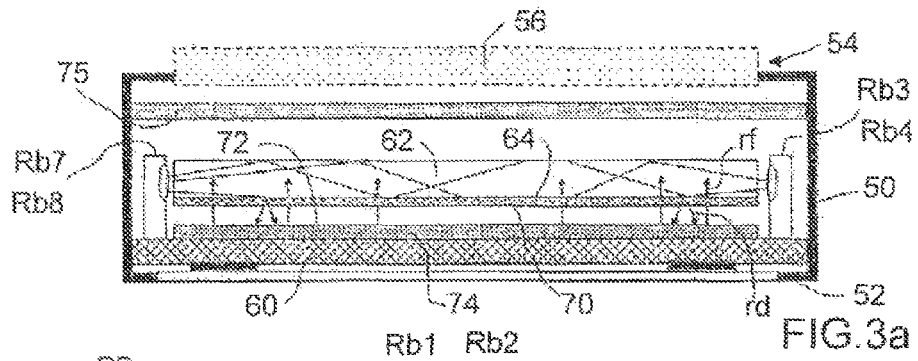
FIGS. 3a and 3b show a sectional view and a top view of a light box according to the invention, respectively.
Figure 3B:
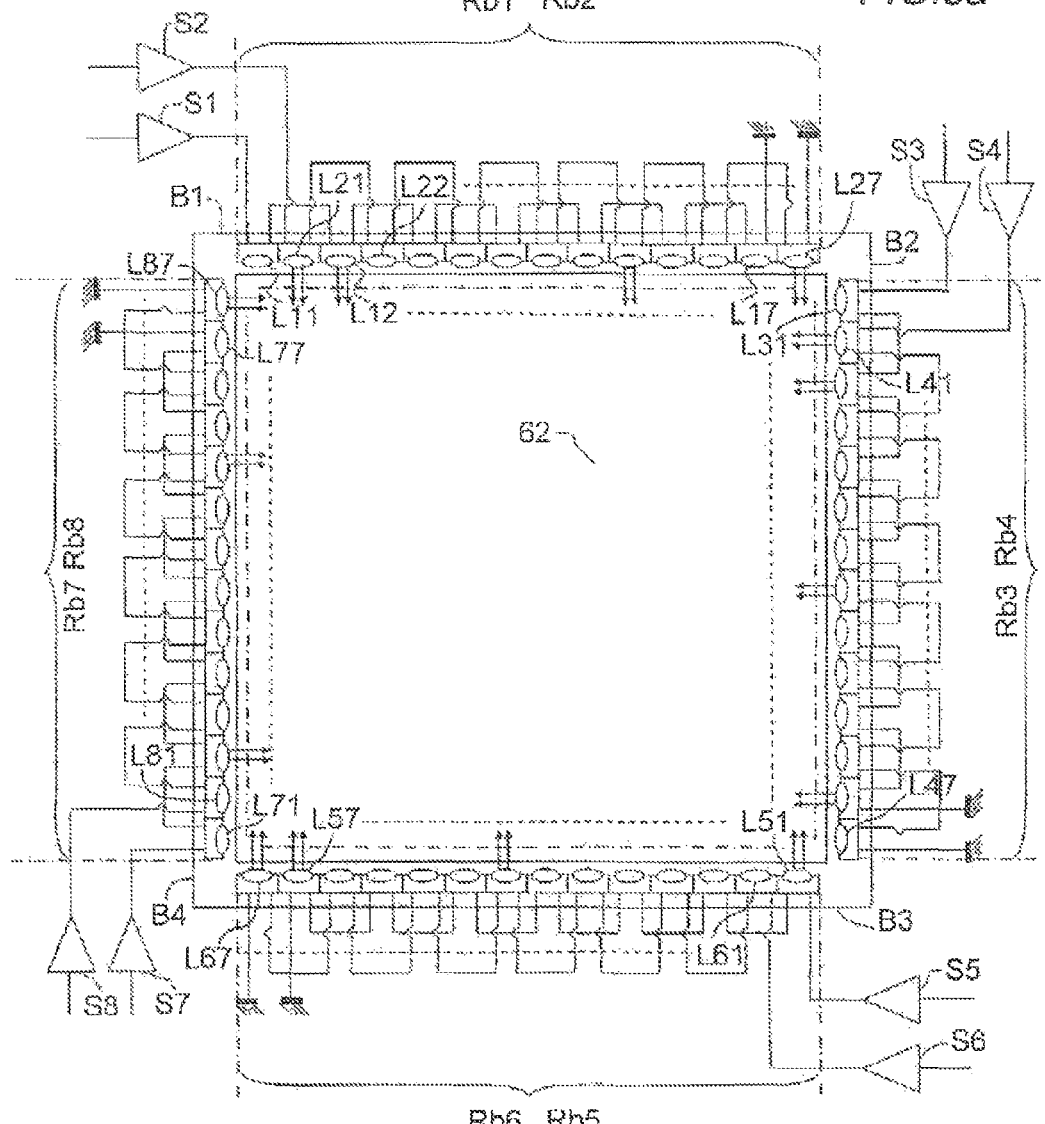

FIGS. 3a and 3b show a sectional view and a top view of a light box according to the invention, respectively. The light box of FIGS. 3a and 3b comprises a case 51 having a bottom 52 and an opening 54 facing the bottom 52 of the case, for the backlighting of a liquid crystal display 56; on the bottom side of the case 51, a printed circuit 60 parallel to the bottom of the case; and a lightguide 62 having, on one of the faces 64 turned toward the bottom 52 of the case, an optical structure 70 for diffusing the light propagating in the lightguide.

The printed circuit 60 has, on one of its faces 72, on the lightguide side, a reflector 74 for reflecting, onto the opening 54 (rays rf), the light (rays rd) diffused by the optical structure 70 of the lightguide.

The light box of FIG. 3a further includes, on the side of the opening 54 of the box, a diffuser 75 in the form of a plate parallel to the bottom of the case and covering the entire box.

The printed circuit of the light box of FIG. 3, according to the invention, comprises eight rows Rb1, Rb2 . . . Rb8, of seven LEDs Lnm in series, aligned in pairs on each of the edges B1, B2, B3, B4 of the lightguide 60, respectively rows Rb1 and Rb2 illuminating the edge B1, rows Rb3 and Rb4 illuminating the edge B2, rows Rb5 and Rb6 illuminating the edge B3 and rows Rb7 and illuminating the edge B4.

Each of the LEDs is denoted by Lnm, n being the number of the row from 1 to 8, and m the number of the LED in each row, 1 to 7 in this exemplary embodiment, i.e. L11, L12, . . . L17 for row R1; L21, L22, . . . L27 for row R2 and so on up to the LEDs L81, L82, . . . L87 for row R8.

Each of the rows Rb1, Rb2, . . . R8 of the LEDs is supplied by an independent power supply S1, S2, . . . S8 respectively and according to a main feature of the invention, for a given edge of the lightguide, a light-emitting diode Lnm in a row Rbn supplied by an electric power supply is immediately followed by a light-emitting diode L(n+1)m in the other row Rb(n+1) supplied by another electric power supply. Thus, for example, the LEDs in rows Rb1 and Rb2 are interleaved in such a way that the LED L11 in row Rb1 is immediately followed by the LED L21 in row Rb2, then the latter by the LED L12 in row Rb1 and so on until the last LED L28 in row R2 terminating the illumination of the edge B1 of the lightguide. The other edges B2, B3 and B4 have the LEDs of the other branches, Rb3, Rb4; Rb5, Rb6; and Rb7, Rb8, respectively, in the same configuration.

Figure 3C:
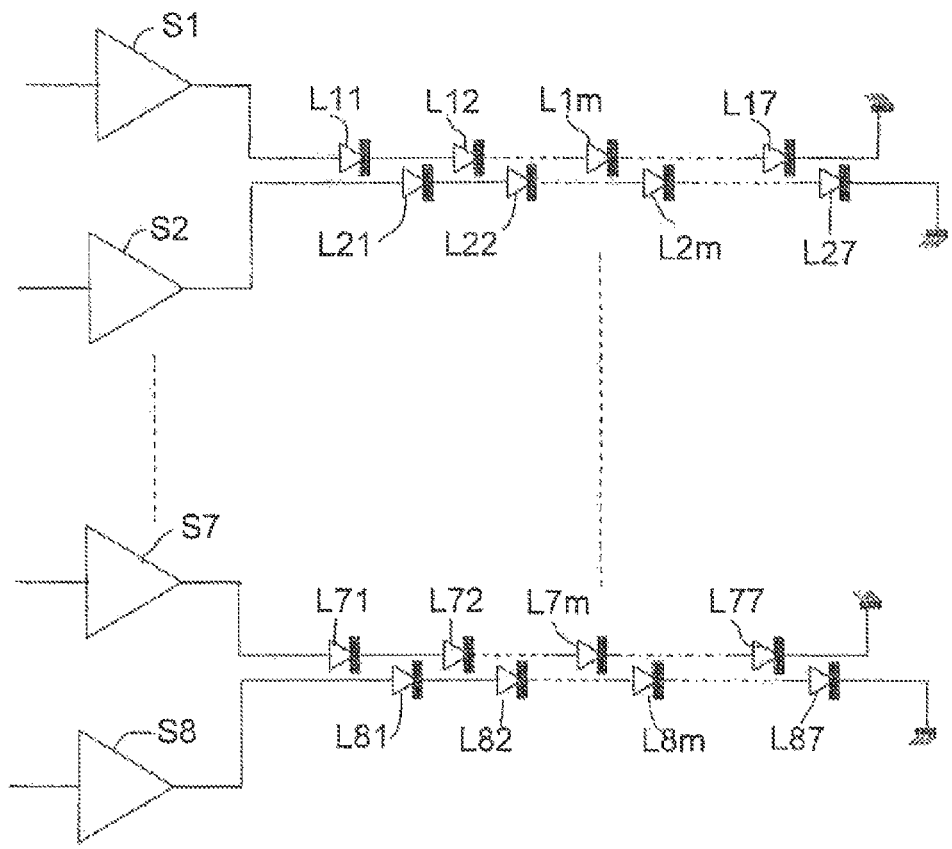
FIG. 3c shows the circuit diagrams for connecting the LEDs of the light box of FIG. 3b.

FIG. 3c shows the circuit diagrams for connecting the LEDs Lnm of the light box of FIG. 3b to the respective power supplies S1 to S8.

When the size of the light box is large, the edge of the lightguide may have more than one row of aligned diodes.

Figure 4:
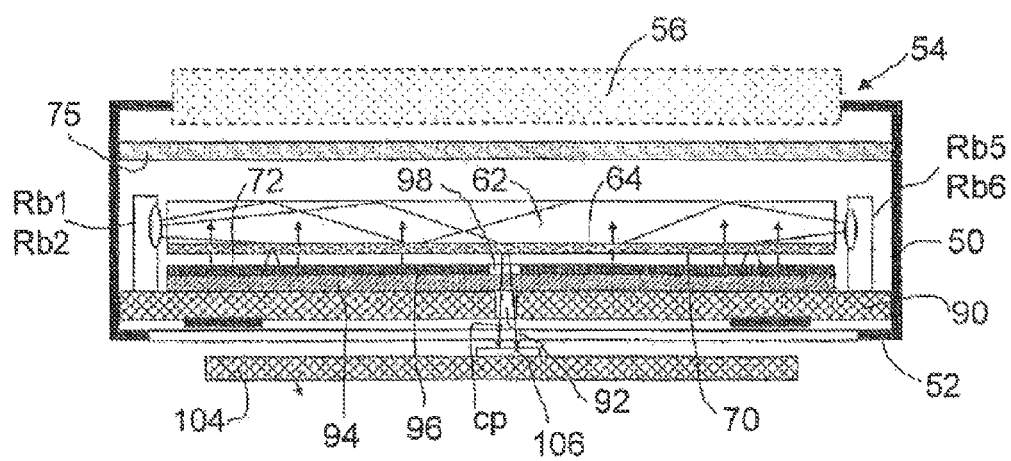
FIG. 4 shows a first variant of the light box according to the invention.

FIG. 4 shows a first variant of the light box of FIG. 3a according to the invention.

The light box of FIG. 4 comprises the case 51 having a bottom 52 and an opening 54 facing the bottom 52 for the backlighting of the liquid crystal display 56 and, on the bottom side of the case 51, a printed circuit 90 parallel to the bottom of the case and pierced by a central hole 92, the lightguide 62 having, on one of the faces 64 turned toward the bottom 52 of the case, an optical structure 70 for diffusing the light propagating in the lightguide.

The printed circuit 90 is coated, on one of its faces 72, on the side facing the lightguide 62, with a translucent white film 94 and with a diffusing opaque coating 96 having a hole 98 in the coating coaxial with the axis of the central hole 92 of the printed circuit 90. A diffuser 75 is on top of the entire lightguide.

As in the structure of the light box shown in FIGS. 3a and 3b, the printed circuit 90 comprises eight rows Rb1, Rb2, ... Rb8, of seven LEDs Lnm in series, aligned on each of the edges B1, B2, B3, B4 of the lightguide 62, respectively, each row being supplied by its respective power supply S1 to S8.

The light box of the embodiments shown in FIGS. 3a, 3b and 4 measures 2.3 inches by 2.3 inches, the waveguide having a thickness of 1 mm. The central hole 92 in the printed circuit 90 of FIG. 4 has a diameter of 3 mm.

The light box of FIG. 4 further includes an additional printed circuit 104 having a photoelectric sensor 106 receiving the light (rays cp) diffused by the diffusing optical structure 70 of the lightguide through the hole 98 in the opaque coating and the central hole 92 in the printed circuit.

In this variant of FIG. 4, the photoelectric sensor (or photodetector) delivers electrical data Up as a function of the luminous intensity of the light box illumination. This data Up may be used to detect a failure or a drop in illumination of the light box, but also to servocontrol the luminous intensity delivered by the light box.

Figure 5:
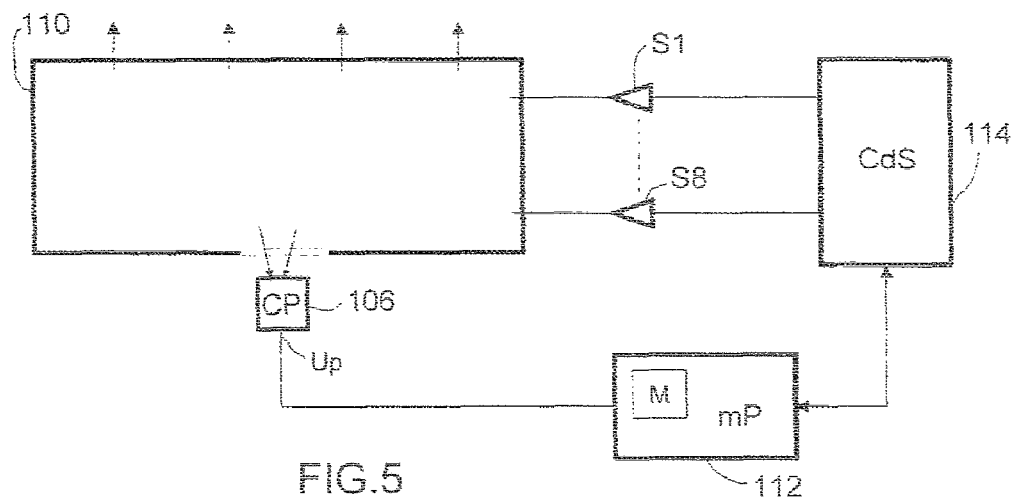
FIG. 5 shows a simplified diagram representing the servo control of a light box having the same structure as that described in FIG. 4, which includes a photoelectric cell.

FIG. 5 shows a simplified diagram representing such servocontrol of a light box 110 having the same structure as that described in FIG. 4, which includes the photoelectric sensor 106.

The electrical data Up output by the photoelectric sensor 106 is transmitted, after being digitized, to a microprocessor mP 112 connected to a CdS control device 114 for controlling the power delivered by the supplies S1 to S8 for rows Rb1 to Rb8 of the LEDs of the light box. The data Up output by the photoelectric sensor is used by the microprocessor 112 in order to act on the CdS control device 114 so as to maintain the luminous intensity in the light box within a specified range of possible variations in illumination levels output by the LEDs. For example, the rows of LEDs of the light box are supplied with a periodic signal in the form of rectangular pulses, the illumination output by the light-emitting diodes being controlled by varying the duty cycle of the rectangular pulses supplying the LEDs, as described above.

In a variant of the light box according to the invention, at least one row of diodes emits a light spectrum different than that emitted by the other rows.

In one exemplary embodiment, a light box according to the invention, having the same structure as that of the embodiment shown in FIG. 4, comprises two rows Rb1 and Rb4 of LEDs emitting a color spectrum different than the other rows Rb2, Rb3, Rb5 to Rb8 of LEDs. For example, the two rows Rb1 and Rb4 emit a red color in the vicinity of 615 nm.

Figure 6:
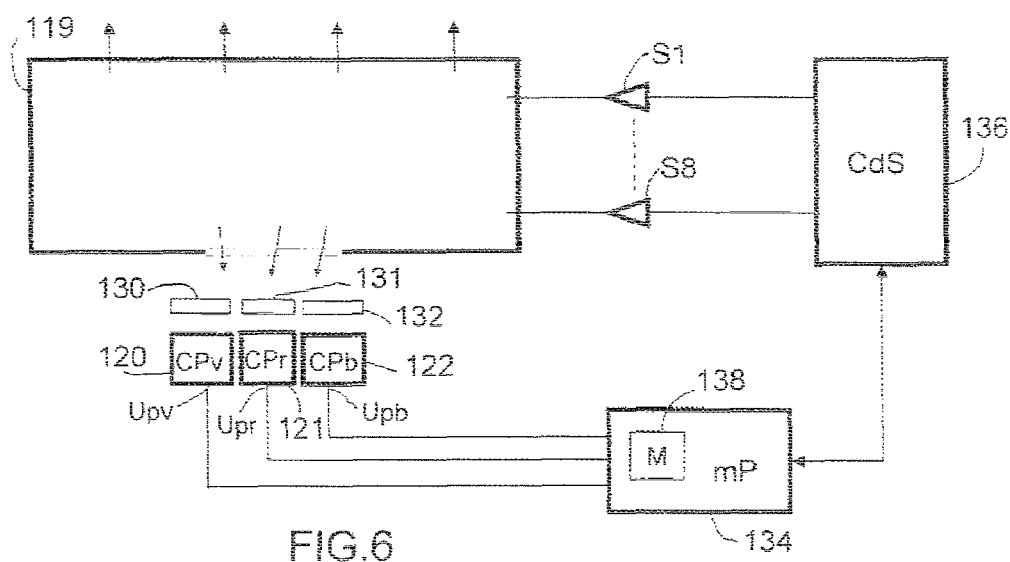
FIG. 6 shows a simplified diagram representing the servo-control of the light emitted by a light box according to the invention, which includes three photoelectric sensors.

FIG. 6 shows a simplified diagram representing the servocontrol of the light emitted by a light box 119 including three photoelectric sensors 120, 121, 122 each having a respective red filter 130, green filter 131 and blue filter 132. The sensors receive, via the hole 98 in the coating and the hole 92 in the printed circuit of the light box, the light diffused by the lightguide.

The electrical data Upr, Upg, Upb output by each of the three photodetectors corresponding to the respective red, green and blue levels of the spectrum emitted by the light box are sent, after being digitized, to the input of a microprocessor mP 134 connected to a CdS control device 136 for controlling the power delivered by the supplies S1 to S8 for rows Rb1 to Rb8 of the LEDs of the light box of each row of LEDs, certain rows emitting a color spectrum different than the others.

The microprocessor mP is configured by a memory M 138 for driving the various rows of LEDs in such a way that the spectrum of the light output by the box is as close as possible to the desired color, for example the color white, and to the specified luminous intensity.

In a variant of the embodiments shown in FIGS. 3a, 3b et seq., the light box according to the invention is compatible with night vision.

Light boxes, especially for military craft or aircraft, must respect certain radiation characteristics in the near-infrared. The LEDs used in the light boxes radiate in the near-infrared and must, for this purpose, be filtered using optical filters.

Figure 7A:
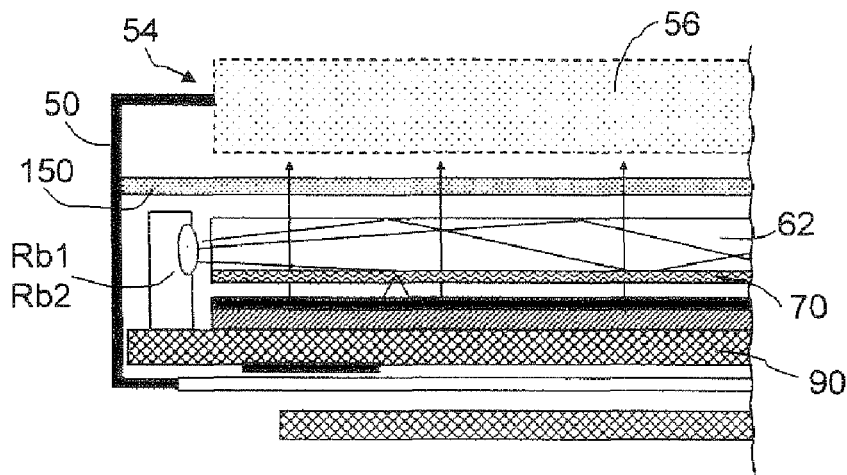
FIGS. 7a, 7b and 7c show partial views of embodiments of light boxes according to the invention, compatible with night vision.
Figure 7B:
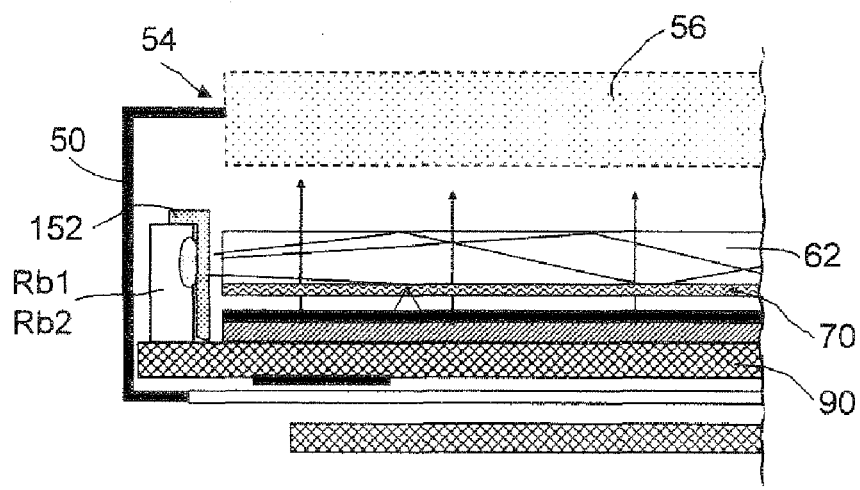
Figure 7C:
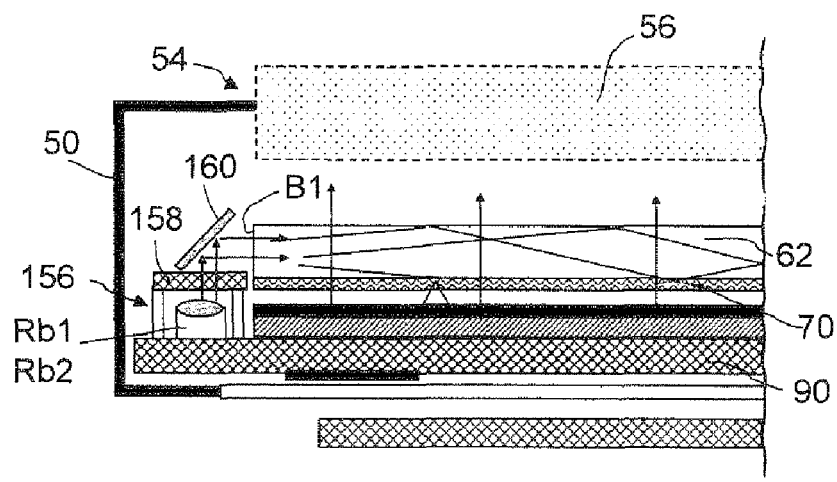

FIGS. 7a, 7b and 7c show partial views of embodiments of light boxes according to the invention that are compatible with night vision.

In a first embodiment, the light box of FIG. 7a has, on the same side as the opening 54 of the box, an optical filter 150 in the form of a plate parallel to the bottom of the case, covering the entire box, and thus filtering all of the light radiation emitted by the box. The liquid crystal display receives filtered light radiation, the near-infrared spectrum having been filtered out.

In a second embodiment shown in FIG. 7b, the rows of LEDs themselves are covered by a near-infrared optical filter 152, for example in the form of a mask over the entire length of the branches of LEDs. Another solution could consist in molding the rows of LEDs with a material that filters out the near-infrared radiation and having, for example, the form of a mask.

In a third embodiment shown in FIG. 7c, the LEDs are wired to the printed circuit 90 so as to emit light radiation perpendicular to the faces of the lightguide 62, the rows of diodes being encased in a small case 156, of the length of the rows, said small case being closed in its upper part by a longitudinal near-infrared optical filter 158. A mirror 160, along the entire length of the branches and inclined at 45° to the faces of the lightguide, reflects the filtered light emitted by the rows of LEDs onto the respective edges B1, B2, B3 and B4 of the lightguide.

The light box according to the invention may be combined with a liquid crystal matrix having pixels arranged in a "quad" or four-pixel structure, i.e. with red, green, blue and white pixels.

Figure 8:
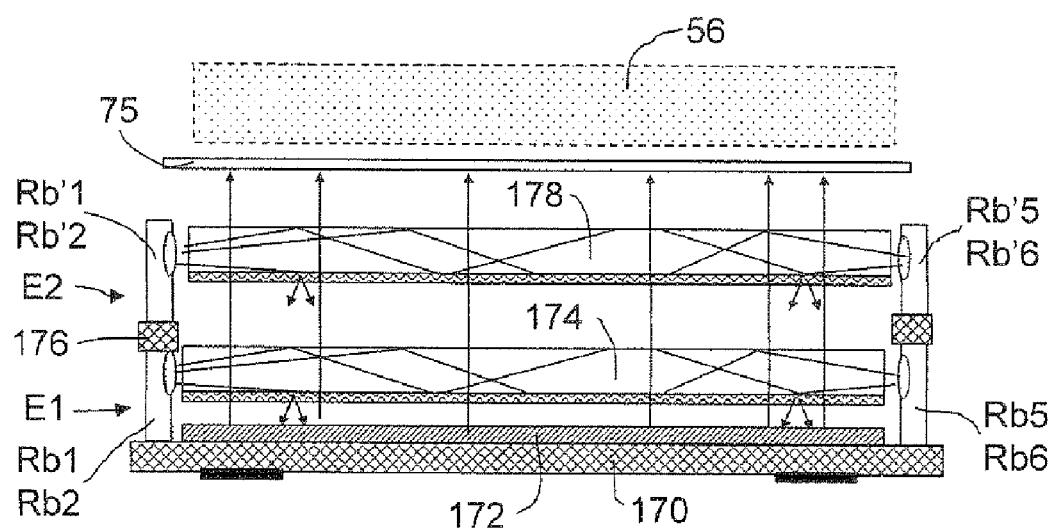
FIG. 8 shows, by way of example, a light box comprising a stack of two stages of LEDs and lightguides.

If a higher illumination intensity than that emitted by a single light box is required, the light box includes a stack of light-emitting diode branches and waveguides associated with each set of branches in any one plane. FIG. 8 shows, by way of example, a light box comprising a stack of two stages of LEDs and lightguides.

A first stage E1 has first branches Rb1 to Rb8 of LEDs wired to a first printed circuit 170 having a reflector 172 and its first associated lightguide 174 and a second stage E2 having second branches Rb'1 to Rb'8 wired to a second printed circuit 176, which is open over the entire surface area of the first lightguide 174 so as to let through all of the light from the two stages that is reflected by the reflector 172 of the first stage E1 and a second lightguide 178 associated with the second branches Rb'1 to Rb'8.

The various light boxes according to the invention ensure that the displays for which they are intended are more available and more easily readable. Furthermore, the possibility of servocontrolling the illumination ensures that the luminous intensity and colorimetry characteristics of the emitted light are maintained over time.

The invention claimed is:
1. A light box, for backlighting of liquid crystal displays, the light box comprising:
a case having a bottom and an opening facing the bottom;

at least a lightguide plate disposed in the case, the lightguide plate having two opposed main faces and at least two edges, and a light-diffusing optical structure formed on the main face proximate the bottom of the case for diffusing the light propagating in the lightguide plate;

at least a printed circuit on the bottom side of the case parallel to the bottom of the case;

a plurality of light-emitting diodes placed linearly along one of the edges of the lightguide plate, the light emitted by the light-emitting diodes entering the lightguide plate via one of the edges and being diffused by the light-diffusing optical structure; and at least two electric power supplies, wherein the plurality of light-emitting diodes are organized in at least two rows and a light-emitting diode in one row is supplied by one of the two electric power supplies and is immediately followed by a light-emitting diode in the other row supplied by another one of the at least two electric power supplies, thereby minimizing variations in uniformity of the illumination provided by the light box in case of failure of one of said rows of LEDs, wherein the printed circuit has a central hole, the printed circuit being coated, on the face facing the lightguide plate, with a translucent white film and with a diffusing opaque coating having a hole in the coating coaxial with the central hole of the printed circuit.

2. The light box as claimed in claim 1, comprising an additional printed circuit having a photoelectric sensor receiving the light (rays cp) diffused by the diffusing optical structure of the lightguide plate through the hole in the opaque coating and the central hole in the printed circuit, the photoelectric sensor delivering electrical data Up as a function of a luminous intensity of the light box illumination.

3. The light box as claimed in claim 2, wherein the electrical data Up output by the photoelectric sensor is transmitted, after being digitized, to a microprocessor connected to a control device for controlling the power delivered by the supplies for rows of the LEDs of the light box, the data Up output by the photoelectric sensor being used by the microprocessor in order to act on the control device so as to maintain the luminous intensity in the light box within a specified range of possible illumination levels output by the LEDs.

4. The light box as claimed in claim 1, further comprising three photodetectors each having a respective red filter, green filter and blue filter, the photodetectors receiving, via the hole in the coating and the central hole in the printed circuit of the light box, the light diffused by the lightguide plate.

5. The light box as claimed in claim 4, wherein the electrical data (Upr, Upg, Upb) output by each of the three photodetectors corresponding to the respective red, green and blue levels of the spectrum emitted by the light box is sent, after being digitized, to the input of a microprocessor connected to a control device for controlling power delivered by the supplies for rows of the LEDs of the light box of each row of LEDs emitting a different color spectrum, the microprocessor being configured by a memory for driving the various rows of LEDs in such a way that the spectrum of the light output by the box is as close as possible to a desired color, and to a desired luminous intensity.

6. A light box, for backlighting of liquid crystal displays, the light box comprising:

a case having a bottom and an opening facing the bottom;

at least a lightguide plate disposed in the case, the lightguide plate having two opposed main faces and at least two edges, and a light-diffusing optical structure formed on the main face proximate the bottom of the case for diffusing the light propagating in the lightguide plate;

at least a printed circuit on the bottom side of the case parallel to the bottom of the case;

a plurality of light-emitting diodes placed linearly along one of the edges of the lightguide plate, the light emitted by the light-emitting diodes entering the lightguide plate via one of the edges and being diffused by the light-diffusing optical structure; and at least two electric power supplies, a stack of light-emitting diode rows and waveguides associated with each set of rows in any one plane, wherein the plurality of light-emitting diodes are organized in at least two rows and a light-emitting diode in one row is supplied by one of the two electric power supplies and is immediately followed by a light-emitting diode in the other row supplied by another one of the at least two electric power supplies, thereby minimizing variations in uniformity of the illumination provided by the light box in case of failure of one of said rows of LEDs.

7. The light box as claimed in claim 6, comprising a first stage E1 having first rows Rb1 to Rb8 of LEDs wired to a first printed circuit having a reflector and a first associated lightguide, and a second stage E2 having second rows Rb'1 to Rb'8 wired to a second printed circuit, which is open over the entire surface area of the first lightguide so as to let through all of the light from the two stages that is reflected by the reflector of the first stage E1 and a second lightguide associated with the second rows Rb'1 to Rb'8.

8. A light box, for backlighting of liquid crystal displays, the light box comprising:

a case having a bottom and an opening facing the bottom;

at least a lightguide plate disposed in the case, the lightguide plate having two opposed main faces and at least two edges, and a light-diffusing optical structure formed on the main face proximate the bottom of the case for diffusing the light propagating in the lightguide plate;

at least a printed circuit on the bottom side of the case parallel to the bottom of the case;

a plurality of light-emitting diodes placed linearly along one of the edges of the lightguide plate, the light emitted by the light-emitting diodes entering the lightguide plate via one of the edges and being diffused by the light-diffusing optical structure; and at least two electric power supplies, wherein the plurality of light-emitting diodes are organized in at least two rows and a light-emitting diode in one row is supplied by one of the two electric power supplies and is immediately followed by a light-emitting diode in the other row supplied by another one of the at least two electric power supplies, thereby minimizing variations in uniformity of the illumination provided by the light box in case of failure of one of said rows of LEDs, the lightguide plate is of rectangular shape having four edges B1, B2, B3, B4 and eight rows of light-emitting diodes, one pair of diode rows illuminating a respective edge of the lightguide plate, the printed circuit includes the eight rows Rb1, Rb2, ... Rb8, of seven LEDs Lnm in series, n being the number of the row from 1 to 8, and m being the number of the LED in each row, the rows being aligned in pairs on each of the edges B1, B2, B3, B4 of the lightguide plate, respectively, rows Rb1 and Rb2 illuminating the edge B1, rows Rb3 and Rb4 illuminating the edge B2, rows Rb5 and Rb6 illuminating the edge B3 and rows Rb7 and Rb8 illuminating the edge B4, and each of the rows Rb1, Rb2, . . . Rb8 of the LEDs is supplied by an independent power supply S1, S2, . . . S8 respectively, and for a given edge of the lightguide plate, a light-emitting diode Lnm in a row Rbn supplied by an electric power supply is immediately followed by a light-emitting diode L(n+1)m in the other row Rb(n+1) supplied by another electric power supply, so that the LEDs in rows Rb1 and Rb2 are interleaved in such a way that the LED L11 in row Rb1 is immediately followed by the LED L21 in row Rb2, then the latter by the LED L12 in row Rb1 and so on until the last LED L28 in row R2 terminating the illumination of the edge B1 of the lightguide plate, the other edges B2, B3 and B4 having the LEDs of the other rows, Rb3, Rb4; Rb5, Rb6; and Rb7, Rb8, respectively, in the same configuration.

9. A light box, for backlighting of liquid crystal displays, the light box comprising:
a case having a bottom and an opening facing the bottom;
at least a lightguide plate disposed in the case, the lightguide plate having two opposed main faces and at least two edges, and a light-diffusing optical structure formed on the main face proximate the bottom of the case for diffusing the light propagating in the lightguide plate;
at least a printed circuit on the bottom side of the case parallel to the bottom of the case;
a plurality of light-emitting diodes placed linearly along one of the edges of the lightguide plate, the light emitted by the light-emitting diodes entering the lightguide plate via one of the edges and being diffused by the light-diffusing optical structure; and
at least two electric power supplies,
wherein
the plurality of light-emitting diodes are organized in at least two rows and a light-emitting diode in one row is supplied by one of the two electric power supplies and is immediately followed by a light-emitting diode in the other row supplied by another one of the at least two electric power supplies, thereby minimizing variations in uniformity of the illumination provided by the light box in case of failure of one of said rows of LEDs, and
when the rows of LEDs are supplied with a periodic signal in the form of rectangular pulses, the illumination output by the light-emitting diodes is controlled by varying a duty cycle of the rectangular pulses.

10. A light box, for backlighting of liquid crystal displays, the light box comprising:
a case having a bottom and an opening facing the bottom;
at least a lightguide plate disposed in the case, the lightguide plate having two opposed main faces and at least two edges, and a light-diffusing optical structure formed on the main face proximate the bottom of the case for diffusing the light propagating in the lightguide plate;
at least a printed circuit on the bottom side of the case parallel to the bottom of the case;
a plurality of light-emitting diodes placed linearly along one of the edges of the lightguide plate, the light emitted by the light-emitting diodes entering the lightguide plate via one of the edges and being diffused by the light-diffusing optical structure; and
at least two electric power supplies,
wherein
the plurality of light-emitting diodes are organized in at least two rows and a light-emitting diode in one row is supplied by one of the two electric power supplies and is immediately followed by a light-emitting diode in the other row supplied by another one of the at least two electric power supplies, thereby minimizing variations in uniformity of the illumination provided by the light box in case of failure of one of said rows of LEDs,
the rows of LEDs themselves are covered by a near-infrared optical filter, in the form of a mask, over the entire length of the rows of LEDs.

11. A light box, for backlighting of liquid crystal displays, the light box comprising:
a case having a bottom and an opening facing the bottom;
at least a lightguide plate disposed in the case, the lightguide plate having two opposed main faces and at least two edges, and a light-diffusing optical structure formed on the main face proximate the bottom of the case for diffusing the light propagating in the lightguide plate;
at least a printed circuit on the bottom side of the case parallel to the bottom of the case;
a plurality of light-emitting diodes placed linearly along one of the edges of the lightguide plate, the light emitted by the light-emitting diodes entering the lightguide plate via one of the edges and being diffused by the light-diffusing optical structure; and
at least two electric power supplies,
wherein
the plurality of light-emitting diodes are organized in at least two rows and a light-emitting diode in one row is supplied by one of the two electric power supplies and is immediately followed by a light-emitting diode in the other row supplied by another one of the at least two electric power supplies, thereby minimizing variations in uniformity of the illumination provided by the light box in case of failure of one of said rows of LEDs, and
the rows of LEDs are molded with a material that filters out near-infrared radiation.

12. A light box, for backlighting of liquid crystal displays, the light box comprising:
a case having a bottom and an opening facing the bottom;
at least a lightguide plate disposed in the case, the lightguide plate having two opposed main faces and at least two edges, and a light-diffusing optical structure formed on the main face proximate the bottom of the case for diffusing the light propagating in the lightguide plate;
at least a printed circuit on the bottom side of the case parallel to the bottom of the case;
a plurality of light-emitting diodes placed linearly along one of the edges of the lightguide plate, the light emitted by the light-emitting diodes entering the lightguide plate via one of the edges and being diffused by the light-diffusing optical structure; and
at least two electric power supplies,
wherein
the plurality of light-emitting diodes are organized in at least two rows and a light-emitting diode in one row is supplied by one of the two electric power supplies and is immediately followed by a light-emitting diode in the other row supplied by another one of the at least two electric power supplies, thereby minimizing variations in uniformity of the illumination provided by the light box in case of failure of one of said rows of LEDs, and
the LEDs are wired to the printed circuit so as to emit light radiation perpendicular to the faces of the lightguide, the rows of diodes being encased in a small case of the length of the rows, said small case being closed in its upper part by a longitudinal near-infrared optical filter, a minor along the entire length of the rows and inclined at 45° to the main faces of the lightguide plate, reflecting the filtered light emitted by the rows of LEDs onto the respective edges B1, B2, B3 and B4 of the lightguide plate.

* * * * *

UNITED STATES PATENT AND TRADEMARK OFFICE
CERTIFICATE OF CORRECTION

| | | |
|---|---|---|
| PATENT NO. | : 8,215,818 B2 | Page 1 of 1 |
| APPLICATION NO. | : 11/576237 | |
| DATED | : July 10, 2012 | |
| INVENTOR(S) | : Bertrand Morbieu and David Chaillou | |

It is certified that error appears in the above-identified patent and that said Letters Patent is hereby corrected as shown below:

Title page, Item (75) Inventors:

The second inventors' name "David Shaillou" should read -- David Chaillou --.

Signed and Sealed this
Twenty-fifth Day of September, 2012

David J. Kappos
*Director of the United States Patent and Trademark Office*